United States Patent [19]

Brusasco

[11] Patent Number: 4,938,090
[45] Date of Patent: Jul. 3, 1990

[54] AXIAL ACTUATOR

[75] Inventor: Enzo Brusasco, Turin, Italy

[73] Assignee: R.G.B. S.p.A., Italy

[21] Appl. No.: 223,426

[22] Filed: Jul. 22, 1988

[30] Foreign Application Priority Data

Jul. 24, 1987 [IT] Italy ................................ 53558/87[U]

[51] Int. Cl.$^5$ ............................................. F16H 25/22
[52] U.S. Cl. .................. 74/424.8 R; 74/459; 384/609
[58] Field of Search ............... 74/459, 424.8 R, 89.15; 384/609, 610, 611, 612, 613, 614

[56] References Cited

U.S. PATENT DOCUMENTS

| 1,219,921 | 3/1917 | Collins, Jr. | 384/609 |
| 1,462,938 | 7/1923 | Knapp | 384/609 |
| 3,898,890 | 8/1975 | Simmons et al. | 74/459 X |
| 3,965,761 | 6/1976 | Stanley | 74/459 X |
| 4,269,460 | 5/1981 | Orain | 384/611 |
| 4,509,382 | 4/1985 | Colautti et al. | 74/424.8 R |
| 4,604,911 | 8/1986 | Teramachi | 74/424.8 R |

FOREIGN PATENT DOCUMENTS

| 0226065 | 6/1987 | European Pat. Off. . |
| 1914550 | 11/1973 | Fed. Rep. of Germany . |
| 596475 | 3/1978 | France . |
| 1183720 | 3/1970 | United Kingdom . |

Primary Examiner—Allan D. Herrmann
Assistant Examiner—Janice E. Chartoff
Attorney, Agent, or Firm—Steele, Gould & Fried

[57] ABSTRACT

An axial actuator wherein an output rod is controlled axially by a recirculating-ball screw-nut screw coupling, the screw of which is formed on the rod, and the nut screw of which is supported in rotary and axially-fixed manner on a support and rotated in relation to the same by a motor; the nut screw constituting the intermediate ring of a double thrust bearing mounted, via the interposition of a flexible support, between two opposite surfaces on the support.

5 Claims, 4 Drawing Sheets

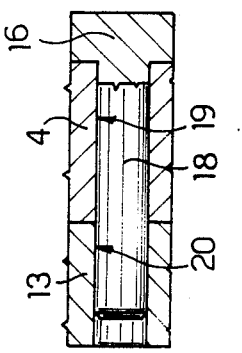
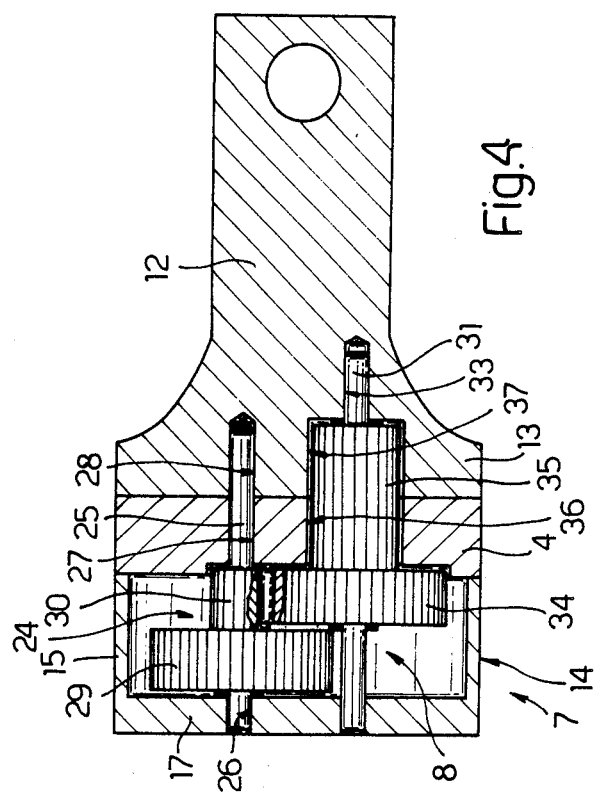

AXIAL ACTUATOR

BACKGROUND OF THE INVENTION

The present invention relates to an axial actuator. On known axial actuators, the output member comprises a screw designed to move axially by virtue of a nut screw mounted in an axially-fixed manner on a support and rotated in relation to the same by a motor or other drive member.

Known actuators of the aforementioned type usually present a relatively complex, high-cost structure, particularly as regards connection of the nut screw to the said support, which connection normally involves using taper roller bearings.

SUMMARY OF THE INVENTION

The aim of the present invention is to provide an axial actuator of the aforementioned type, wherein connection of the nut screw and respective support is straightforward and cheap, and involves a minimum number of parts, thus enabling the formation of a highly compact, reliable assembly.

With this aim in view, according to the present invention, there is provided an axial actuator comprising an axially-mobile output rod, and drive means for so moving the same, the said drive means comprising a support fitted through with the said rod; a screw-nut screw coupling wherein the screw is integral with the said rod, and the nut screw is supported in a rotary and axially-fixed manner on the said support; and a motor connected to the said nut screw so as to turn it about its own axis; characterised by the fact that the said nut screw constitutes the intermediate ring of a double thrust bearing mounted between two opposite faces on the said support.

BRIEF DESCRIPTION OF THE DRAWINGS

A non-limiting embodiment of the present invention will be described by way of example with reference to the accompanying drawings, in which:

FIG. 4 shows a section along line IV—IV in FIG. 1;
FIG. 6 shows a section along line VI—VI in FIG. 1;

DETAILED DESCRIPTION OF THE INVENTION

Figure 2:
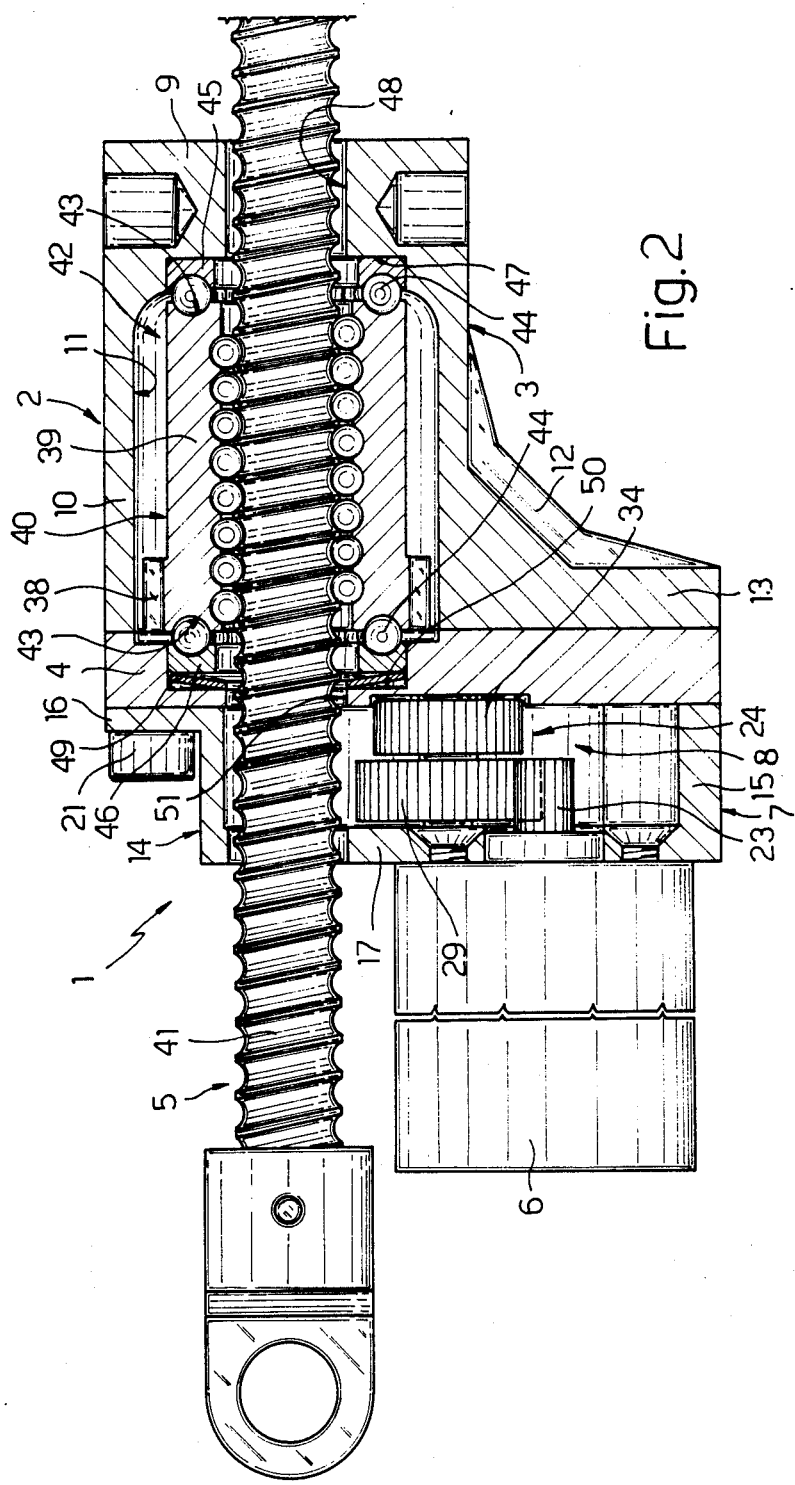
FIG. 2 shows a section along line II—II in FIG. 1.

Number 1 in FIG. 2 indicates an axial actuator comprising a box body 2 consisting of a cup-shaped body 3 closed by a cover 4. Actuator 1 also comprises a through output rod 5 extending through body 3 and cover 4, and powered axially by an electric motor 6 supported on a housing 7 connected to cover 4 and housing part of a drive 8 connecting motor 6 to rod 5.

Body 3 comprises an end wall 9 and a side wall 10 defining a substantially cylindrical cavity 11 coaxial with rod 5; and an outer lateral appendix 12 integral with wall 10 and terminating with a flange 13 coplanar with the open end of cavity 11.

Cover 4 is defined by a substantially flat plate extending in contact with both the free end of wall 10 and flange 13, so as to form a cover for casing 7. The said housing 7 comprises a cup-shaped body 14 contacting cover 4 and having its concave side facing that of cup-shaped body 3, and is defined by a side wall 15 having an end flange 16, and by a flat end wall 17 parallel with cover 4 and supporting motor 6.

Figure 1:
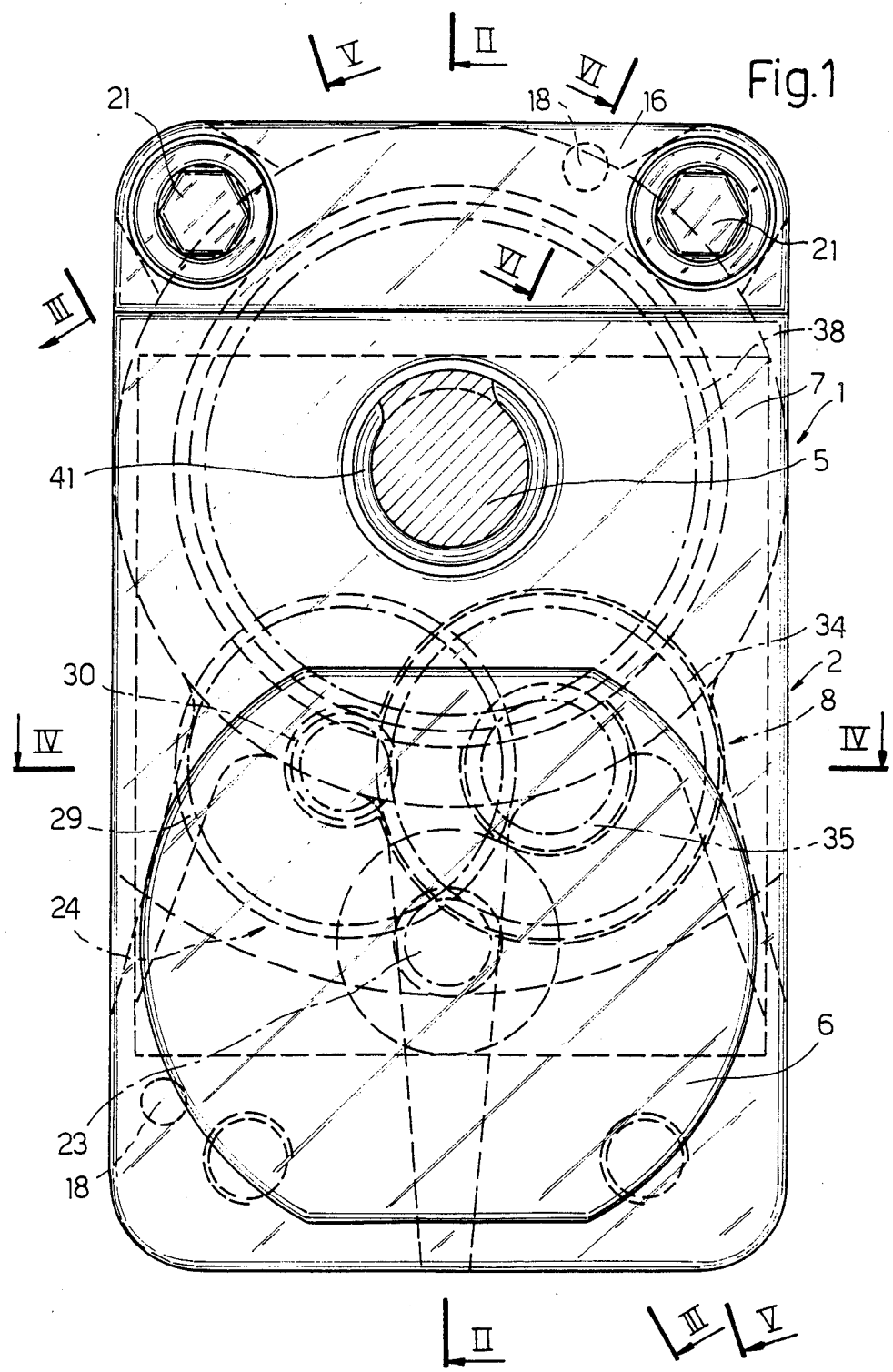
FIG. 1 shows a partially-sectioned plan view of a preferred embodiment of the actuator according to the present invention.

As shown in FIGS. 1 and 6, from flange 16 there extend two locating pins 18, each of which engages a through hole 19 on cover 4, and a through hole 20 on flange 13. As shown in FIGS. 1 and 2, a number of screws 21 connect flanges 13 and 16 with cover 4 inbetween.

Figure 3:
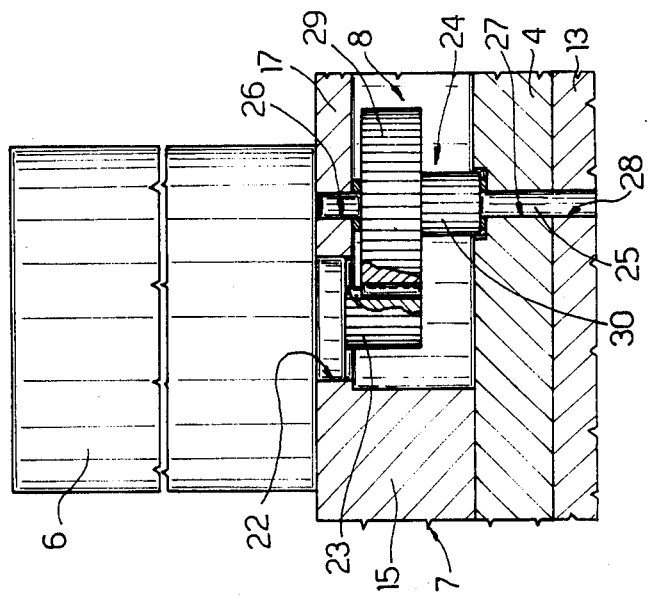
FIG. 3 shows a section along line III—III in FIG. 1.

As shown, particularly in FIG. 3, motor 6 is located over flange 13 and to the side of rod 5, and presents an output shaft extending inside housing 7 through hole 22 in wall 17, and fitted with a cylindrical gear 23 constituting the input member of drive 8.

Figure 5:
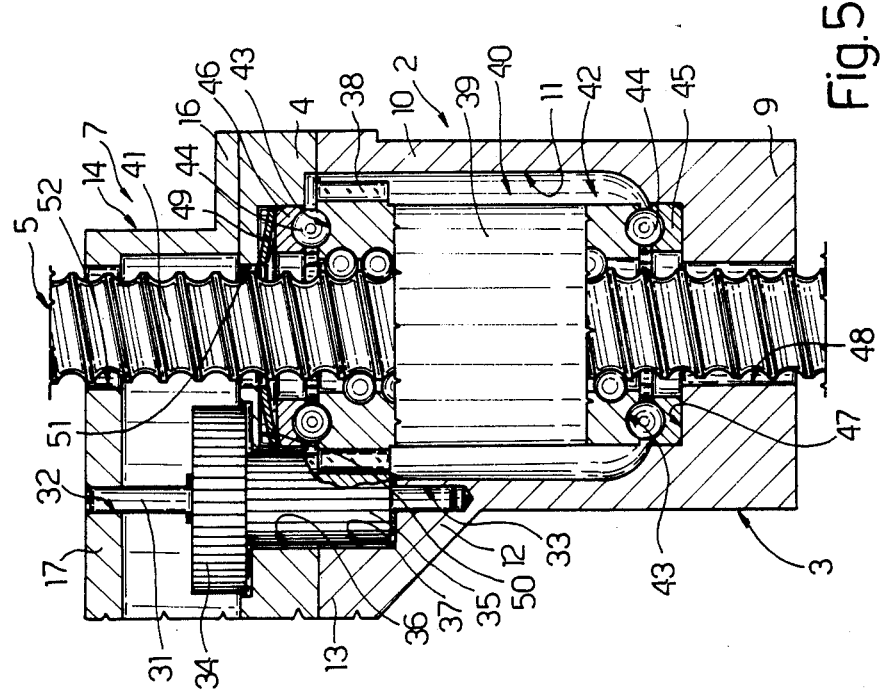
FIG. 5 shows a section along line V—V in FIG. 1.

As shown, particularly in FIGS. 3, 4 and 5, drive 8 comprises a reduction gear 24 substantially housed inside housing 7 and in turn comprising a first shaft 25 mounted in idle manner, at one end, inside hole 26 through wall 17, and, at the other end, inside coaxial holes 27 and 28 through cover 4 and in flange 13. Shaft 25 is fitted with a cylindrical gear 29 connected to gear 23, and a second cylindrical gear 30 smaller in diameter than gear 29.

Reduction gear 24 also comprises a second shaft 31 mounted in idle manner, at one end, inside hole 32 through wall 17, and, at the other end, inside a dead axial hole 33 in wall 10. Shaft 31 is parallel with shaft 25, and is fitted with a cylindrical gear 34 connected to gear 30, and a second cylindrical gear 35 smaller in diameter than gear 34 and housed in rotary manner partly inside through hole 36 in cover 4, and partly inside a groove 37 formed on the inner surface of wall 10 and communicating with cavity 11.

Gear 35 constitutes the output member of reduction gear 24, and is connected to a gear 38 formed on the outer surface of a cylindrical coupling 39 constituting the nut screw of a recirculating-ball screw-nut screw coupling indicated as a whole by 40 and the screw 41 of which is formed along rod 5.

As shown, particularly in FIGS. 2 and 5, coupling 39 constitutes the intermediate ring of a double thrust bearing 42, and presents, on its opposite axial ends, two tracks 43 for sets of balls 44 supporting coupling 39 in rotary manner on two outer rings 45 and 46. Ring 45 rests on the bottom of a cavity 47 formed in wall 9 and coaxial with hole 48 formed through wall 9 and engaged by rod 5. Via the interposition of a Belleville washer 49, ring 46 rests on the bottom of a cavity 50 formed in cover 4 and coaxial with hole 51 through cover 4, and hole 52 through wall 17, both engaged by rod 5.

Formation of the nut screw on coupling 40 as an integral part of double thrust bearing 42 clearly provides for a highly reliable, straightforward, low-cost, compact structure designed, also by virtue of Belleville washer 49, to withstand continual reciprocating motion. Actuator 1 as described therefore provides an ideal, highly reliable solution for all applications requiring efficient, striaghtforward, low-cost control of reciprocating members.

I claim:
1. An axial actuator comprising:
an axially-mobile output rod, and drive means for axially moving said rod, said drive means including a support fitted through with said rod, the rod being axially mobile relative to said support;

a screw-nut screw coupling including a screw which is integral with said rod, and a nut screw which is supported in a rotary and axially-fixed manner on said support, said coupling being a recirculating-ball screw-nut screw coupling;

a motor operable to turn said nut screw about its axis, said nut screw constituting an intermediate ring of a double thrust axial bearing mounted between two opposite faces on said support; and, flexible thrust means disposed between said double thrust axial bearing and a single one of said two opposite faces.

2. An actuator as claimed in claim 1, wherein said flexible thrust means comprise a Belleville washer.

3. An actuator as claimed in claim 1, wherein said motor is located to a side of said rod, transmission means being supported on said support for coupling said motor with said nut screw.

4. An actuator as claimed in claim 3, wherein said transmission means comprise a reduction gear.

5. An axial actuator comprising:

an axially-mobile output rod, and drive means for axially moving said rod, said drive means including a support fitted through with said rod, the rod being axially mobile relative to said support;

a screw-nut screw coupling including a screw which is integral with said rod, and a nut screw which is supported in a rotary and axially-fixed manner on said support;

a motor operable to turn said nut screw about its axis, said nut screw constituting an intermediate ring of a double thrust axial bearing mounted between two opposite faces on said support; and, flexible thrust means disposed between said double thrust axial bearing and a single one of said two opposite faces, and wherein said double thrust axial bearing comprises an intermediate ring, two end rings facing opposite axial ends of said intermediate ring, and a set of balls axially spacing each said end ring from a respective axial end of said intermediate ring, said intermediate ring comprising a cylindrical coupling constituting said nut screw and having, at each said opposite axial end, a track for a respective said set of balls, and said flexible thrust means being provided between one of said end rings and said one face of said support.

* * * * *